J. BEDI.
CASTER.
APPLICATION FILED SEPT. 4, 1918.
1,333,598.
Patented Mar. 16, 1920.
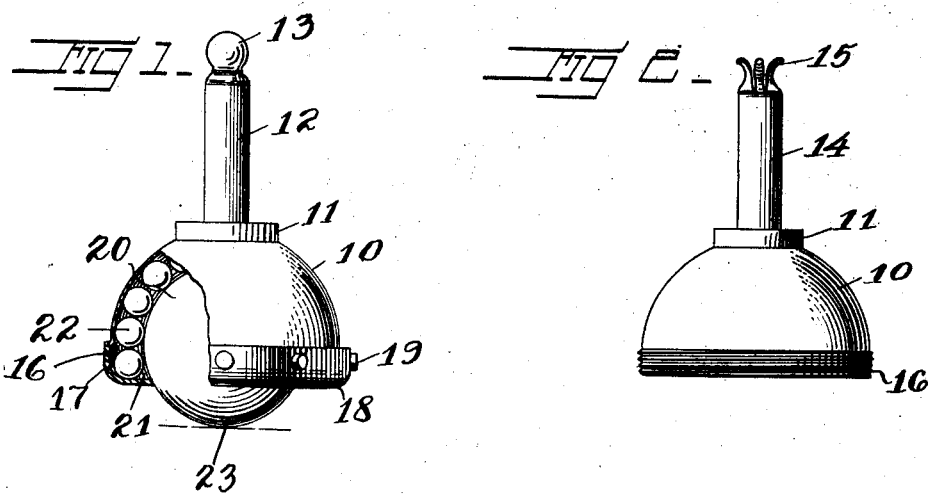
John Bedi Inventor
By his Oscar Geier
Attorney

UNITED STATES PATENT OFFICE.

JOHN BEDI, OF LORAIN, OHIO.

CASTER.

1,333,598. Specification of Letters Patent. Patented Mar. 16, 1920.

Application filed September 4, 1918. Serial No. 252,519.

*To all whom it may concern:*

Be it known that I, JOHN BEDI, a subject of the King of Hungary, residing at Lorain, county of Lorain, and State of Ohio, have invented certain new and useful Improvements in Casters, of which the following is a specification.

The present invention relates to certain novel and useful improvements in furniture casters, and particularly to ball casters in which the caster ball engages in antifriction bearings.

It is the object of the invention to provide an exceedingly simple, strong and durable caster adapted to be readily applied to household furniture, trunks, or other articles of furniture.

It is also an object of the invention to provide a caster, the shank of which has sufficient resiliency to absorb the shocks resulting from the movement of the furniture over a floor, and thus to protect the furniture from damage and the floor from being indented.

A further object of the invention is to provide a caster of the ball and antifriction type wherein the antifriction bearings and the caster ball may be rapidly and easily assembled, and when assembled, are held securely in position.

With the above recited objects and others of a similar nature which will become apparent from the specification and appended claim, the invention consists in the construction, combination, and arrangement of parts illustrated in the accompanying drawing in the preferred form, in which:—

Figure 1 is a front elevational view of a caster constructed according to the present invention with part of its cup broken away.

Fig. 2 is a similar view of the cup and its shank.

Referring now to the drawing in detail: The housing or cup 10 of the caster is provided with an upper flange 11 and a hollow shank 12 removably secured in any well known manner to the cup, and ending in a hollow knob 13. Into this shank 12 the shank proper 14 integrally made with the caster which may be secured to the same in any well known manner is introduced ending at the top in elastic prongs or fingers 15 of any desired number, adapted to resiliently engage the inner wall of the knob 13. On the outside of its lower margin the housing or cup 10 is provided with screw thread 16 with which engages the inner screw thread of a retaining flange 17 of a ring 18 secured to the housing by means of bolts or the like 19. The caster ball 20 is to two thirds of its circumference located within the housing and forms therein with its outer periphery and the inner wall of the housing and the retaining flange the bearing 21 for the antifriction balls 22. The remaining third of the ball 20 extends in the customary manner through the retaining flange as shown at 23.

Having thus described my invention, what I claim as new and desire to secure by Letters Patent is:—

In a ball bearing of the character described, the combination of an integral flanged cup with a solid and a hollow shank removably secured thereto, means for resiliently engaging the solid shank in said hollow shank, a flange at the upper end, and a screw thread at the lower end of said cup, a ball, a retaining ring adapted to be screwed with its flange upon the screw threaded part of said housing or cup, means for connecting said ring and cup, the outer circumference of the ball being located within said cup extending therefrom, and forming with the inner wall of the cup and the retaining ring a ball-race, and antifriction balls within said race.

In testimony whereof I have affixed my signature.

JOHN BEDI.